(12) United States Patent
Smith et al.

(10) Patent No.: US 11,097,523 B1
(45) Date of Patent: Aug. 24, 2021

(54) SYSTEMS AND METHODS FOR ROLL TO ROLL LAMINATIONS

(71) Applicant: Rockwell Collins, Inc., Cedar Rapids, IA (US)

(72) Inventors: Brian K. Smith, Marion, IA (US); Gary N. Prior, Center Point, IA (US); James D. Sampica, Anamosa, IA (US); Derek R. Owen, Anamosa, IA (US); Jeffrey D. Kulper, Manchester, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/176,759

(22) Filed: Oct. 31, 2018

Related U.S. Application Data

(62) Division of application No. 13/893,003, filed on May 13, 2013, now Pat. No. 10,213,999.

(51) Int. Cl.
  *B32B 37/10* (2006.01)
  *B32B 5/00* (2006.01)
  *B32B 37/14* (2006.01)

(52) U.S. Cl.
  CPC .......... *B32B 37/10* (2013.01); *B32B 5/00* (2013.01); *B32B 37/14* (2013.01)

(58) Field of Classification Search
  CPC ..... B32B 2309/12; B32B 37/10; B32B 37/14; B32B 41/00; B32B 5/00; B29C 66/92; B29C 66/924; B29C 66/9241; B29C 66/92431; B29C 66/92441; B29C 66/929; B29C 66/9292; B29C 66/93; B29C 66/934; B29C 66/93431

USPC .................... 156/580–583.91, 182, 324
See application file for complete search history.

(56) References Cited

U.S. PATENT DOCUMENTS

| | | | |
|---|---|---|---|
| 5,306,381 A | 4/1994 | Nakazawa et al. | |
| 5,413,806 A | 5/1995 | Braun | |
| 5,448,901 A | 9/1995 | Yu et al. | |
| 5,961,899 A | 10/1999 | Rossetti et al. | |
| 6,365,284 B1 * | 4/2002 | Liposcak | B32B 27/30 |
| | | | 156/90 |
| 2008/0156421 A1 | 7/2008 | Lee et al. | |

(Continued)

OTHER PUBLICATIONS

Bahadur et al., Direct Dry Film optical bonding—A low-cost, robust, and scalable display lamination technology, Journal of the SID, 2011, vol. 19, Issue 11, pp. 732-740.

(Continued)

*Primary Examiner* — John L Goff, II
(74) *Attorney, Agent, or Firm* — Suiter Swantz pc llo

(57) ABSTRACT

A method of making a laminated optically clear adhesive (OCA) assembly includes providing a first OCA component having a first thickness; providing a second OCA component having a second thickness; and laminating the first OCA component and the second OCA component using a roll to roll lamination process to form the laminated OCA assembly. The first OCA component and the second OCA component are laminated together at a nip roller assembly, the nip roller assembly using a nip roller pressure selected based on the total thickness of the first and second OCA components such that the nip roller pressure decreases as the total thickness of the first and second OCA components increases.

15 Claims, 6 Drawing Sheets

(56) References Cited

U.S. PATENT DOCUMENTS

| | | | | |
|---|---|---|---|---|
| 2009/0316264 | A1* | 12/2009 | Kitamura | C08J 5/18 359/489.2 |
| 2010/0086705 | A1* | 4/2010 | Everaerts | C09J 171/02 428/1.54 |
| 2010/0302487 | A1* | 12/2010 | Storer | B82Y 20/00 349/117 |
| 2010/0314032 | A1* | 12/2010 | Kumagai | B32B 38/1808 156/192 |
| 2018/0050528 | A1 | 2/2018 | Jing | |

OTHER PUBLICATIONS

Final Office Action for U.S. Appl. No. 13/893,003 dated Apr. 2, 2018. 9 pages.
Final Office Action for U.S. Appl. No. 13/893,003 dated Oct. 27, 2016. 7 pages.
Non-Final Office Action on U.S. Appl. No. 13/893,003, dated Apr. 27, 2016, 6 pages.
Notice of Allowance for U.S. Appl. No. 13/893,003 dated Oct. 3, 2018. 8 pages.

* cited by examiner

SYSTEMS AND METHODS FOR ROLL TO ROLL LAMINATIONS

This application is a divisional of U.S. patent Ser. No. 13/893,003, filed May 13, 2013, now U.S. Pat. No. 10,213,999, which is incorporated herein by reference in its entirety.

BACKGROUND

There are many challenges associated with effectively and efficiently laminating rolls of material together, particularly in the context of laminated assemblies having multiple layers of PSA material forming a relatively thick laminated PSA assembly. As such, various embodiments herein are directed to improved systems and methods for laminating such materials together.

SUMMARY

One embodiment relates to a method of making a laminated optically clear adhesive (OCA) assembly, the method comprising providing a first OCA component having a first thickness; providing a second OCA component having a second thickness; laminating the first OCA component and the second OCA component using a roll to roll lamination process to form the laminated OCA assembly; wherein the first OCA component and the second OCA component are laminated together at a nip roller assembly, the nip roller assembly using a nip roller pressure selected based on the total thickness of the first and second OCA components such that the nip roller pressure decreases as the total thickness of the first and second OCA components increases.

Another embodiment relates to a system for laminating at least a first component and a second component, the system comprising a first supply roller configured to support a first roll of a first component; a second supply roller configured to support a second roll of a second component; a nip roller assembly configured to receive the first and second components from the first and second rolls and laminate the first component and the second component to form a laminated assembly using a nip roller pressure selected based on the nip roller pressure increasing as the total thickness of the first and second components decreases.

Another embodiment relates to a laminated optically clear adhesive (OCA) assembly, comprising a first OCA component; a second OCA component laminated to the first OCA component using a roll to roll lamination process; wherein the laminated OCA assembly has a total thickness of at least 0.060 inches.

DETAILED DESCRIPTION OF EXEMPLARY EMBODIMENTS

Referring to the FIGURES generally, various embodiments disclosed herein relate to laminated assemblies of adhesive materials, and more specifically, to relatively thick laminated optically clear adhesive (OCA) assemblies formed by laminating two or more OCA components together using roll to roll lamination systems and methods. While various embodiments disclosed herein relate to the lamination of OCA components, according to other embodiments, the systems and/or methods may be applied to and/or used with other types of components, including non-optically clear and/or non-adhesive components (e.g., touch screens, cover glasses, optically clear polyester, polycarbonate and similar materials, diffusers, diffusing adhesives, etc.). The present disclosure is to be understood to include the use of all such components.

Optical bonding (e.g., bonding one or more optical components together) generally involves the bonding of two or more optical components using an optically clear index-matched adhesive. OCA materials are usable in assemblies such as display assemblies to fill the air gap between components (e.g., between a cover glass and a display) with an index-matched material that reduces specular reflectance and increases the contrast of the display. Additional coatings may be utilized, such as anti-reflective (AR), anti-glare (AG), and/or anti-smudge (AS) coatings, or other treatments or coatings. Optical bonding often provides enhanced legibility of displays in high ambient lighting and improves the environmental performance and structural integrity of the display.

Some embodiments relate to a roll to roll lamination system and method where relatively thick laminated assemblies (e.g., laminated assemblies having a thickness of 0.020 inches, 0.040 inches, or more) are fabricated from multiple layers, or components. The system and method may utilize unique values for parameters that provide desired characteristics (e.g., optical properties, mechanical properties, etc.). The laminated assemblies may be, for example, OCA laminations made of multiple layers of OCA material, where even with multiple layers of lamination and the relatively greater thickness of the assembly, the optical and mechanical quality of the laminated assembly is preserved such that the assembly includes minimal optical defects (e.g., is transparent, without bubbles, wrinkles, etc.), is substantially flat, and is generally stress and strain free (e.g., without undue strains and/or stresses).

Figure 1:
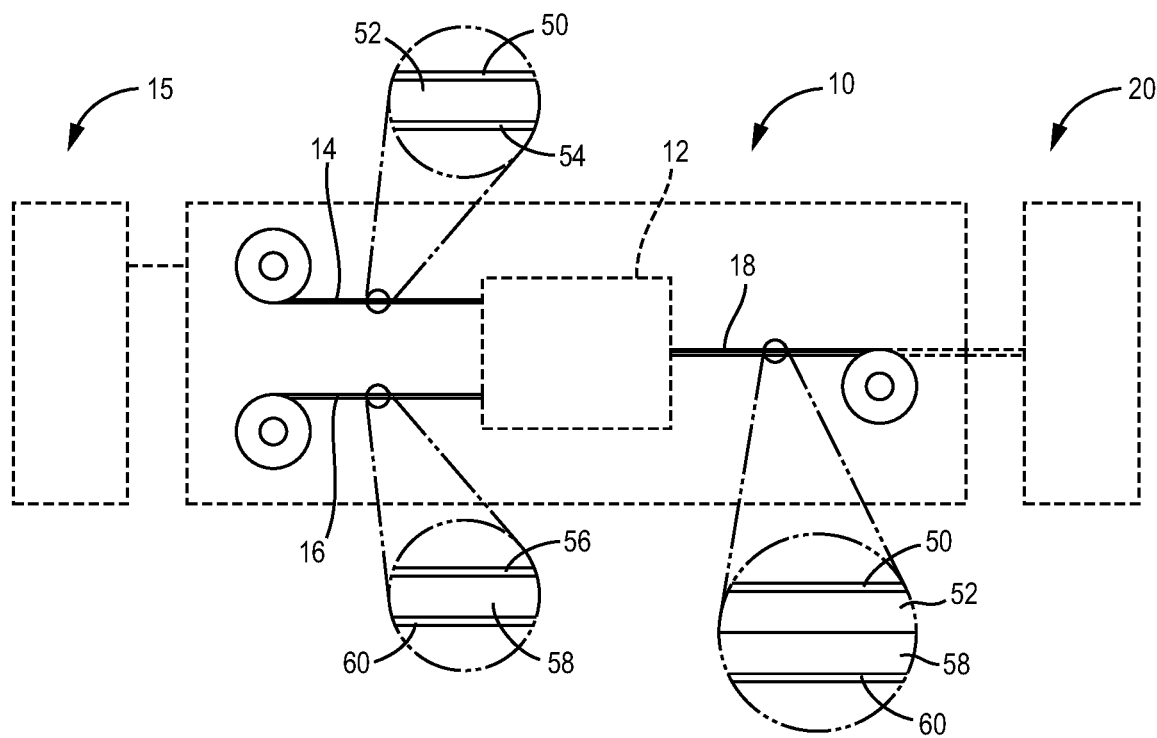
FIG. 1 is a schematic representation of a lamination system according to an exemplary embodiment.

Referring now to FIG. 1, a lamination system is shown as system 10 according to an exemplary embodiment. System 10 includes a lamination device 12 (e.g., a roll to roll laminator, etc.) configured to laminate two or more separate components, or materials, together to form a single laminated assembly. For example, as shown in FIG. 1, device 12 is configured to laminate a first component 14 and a second component 16 together to form a laminated assembly 18. As shown in FIG. 1, after being laminated using lamination system 10, laminated assembly 18 may be subject to further processing (e.g., die cutting, additional lamination processes, etc.) at a device 20. Furthermore, a control system 15 may be configured to control operation of system 10, for example, based on a set of parameters such as material thickness, etc.

According to various exemplary embodiments, first component 14, second component 16, and laminated assembly 18 may be a variety of different materials. For example, each of first component 14 and second component 16 may be an optically clear adhesive (OCA) such that a first OCA component and a second OCA component are laminated together to form a thicker laminated OCA assembly. According to alternative embodiments, first and second components 14, 16 and laminated assembly 18 may take other forms, including non-adhesive, and non-optically clear components and/or assemblies (e.g., thin films, etc.).

According to an exemplary embodiment, first component 14 and/or second component 16 are provided as rolled materials (e.g., as a roll of optically clear adhesive material). For example, as shown in FIG. 1, first component 14 may include a first liner 50, an adhesive component 52 (e.g., a first OCA material), and a second liner 54. First and second liners 50, 54 serve to prevent unwanted contamination surface imperfections and/or adhesion of adhesive component 52 to other surfaces. Similarly, second component 16 may include a first liner 56, an adhesive component 58 (e.g., a second OCA material), and a second liner 60. First and second liners 56, 60 serve to prevent unwanted contamination surface imperfections and/or adhesion of adhesive component 58 to other surfaces.

Upon lamination, first and second components 14, 16 form laminated assembly 18, which may be a relatively thicker laminated OCA assembly. As shown in FIG. 1, assembly 18 includes first liner 50 (from first component 14), adhesive component 52 (from first component 14), adhesive component 58 (from second component 16), and second liner 60 (from second component 16). As discussed in greater detail below, laminated assembly 18 may in turn be subjected to further lamination processes, such as roll to roll lamination process, to form even thicker laminated assemblies and/or other types of assemblies.

According to various alternative embodiments, first component 14 and/or second component 16 may have a variety of thicknesses, widths, and lengths. For example, first component 14 and/or second component 16 may have a thickness (e.g., a thickness of the material between any outer liners) of approximately 0.005 inches, 0.010 inches, 0.020 inches, 0.030 inches, or 0.040 inches or more. One or more liners may add between 0.001 and 0.003 inches to the total thickness. Other thicknesses of first component 14 and/or second component 16 may be used according to various alternative embodiments (e.g., less then 0.005 inches, in a range between any of the listed values, and/or more than 0.040 inches, etc.). The length and/or width of first component 14 and/or second component 16 may also vary. For example, the width of first component 14 and/or second component 16 may be approximately 3 feet, or alternatively, more or less than 3 feet. The length of first component 14 and second component 16 may be any suitable length, such as 180 feet, 270 feet, 540 feet, etc., or any other suitable length that enables the roll to roll lamination processes discussed herein.

While in some embodiments, first component 14 and second component 16 may have substantially identical thicknesses, according to other embodiments, first component 14 and second component 16 may have different thicknesses. For example, in some embodiments first and second components 14, 16 may both be approximately 0.010 inches thick, such that laminated assembly 18 is approximately 0.020 inches thick, while in other embodiments, first component 14 may be approximately 0.010 inches thick and second component 16 may be approximately 0.020 inches thick, such that laminated assembly 18 is approximately 0.030 inches thick. Other combinations of thicknesses are possible according to various other embodiments.

Figure 2:
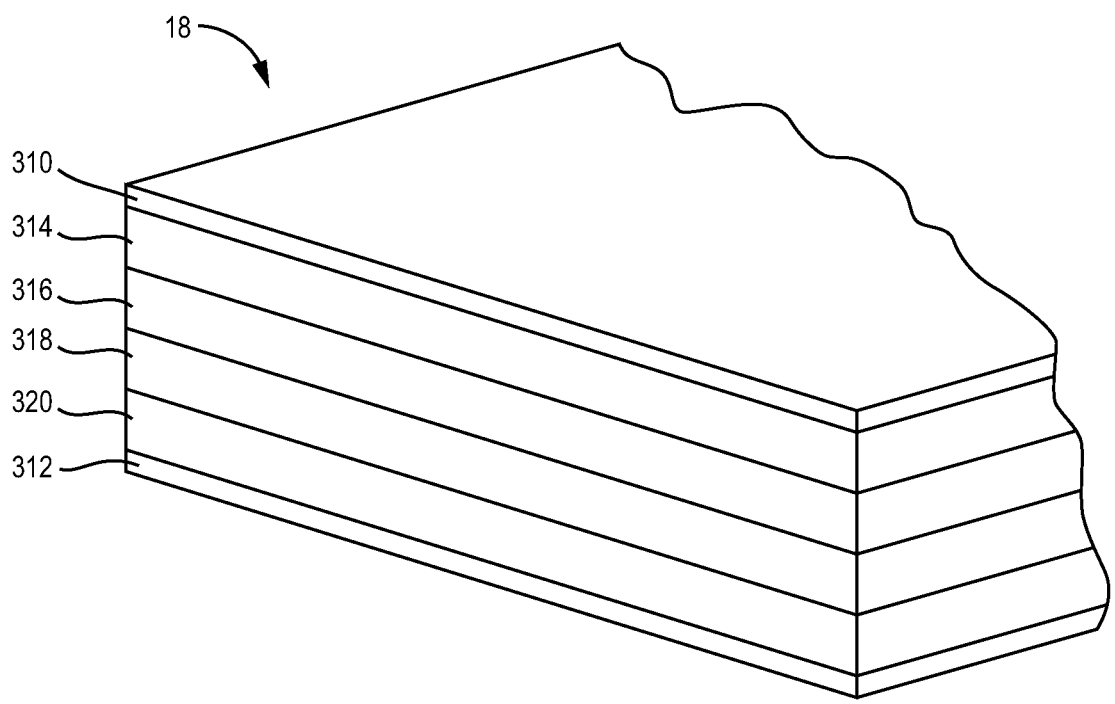
FIG. 2 is a perspective view of a laminated assembly according to an exemplary embodiment.

Further yet, as also discussed in greater detail below, while in some embodiments, first component 14 and/or second component 16 may include a unitary/non-laminated adhesive component between two outer liners, in other embodiments, as shown in FIG. 2, first component 14 and/or second component 16 may themselves be laminated assemblies similar in construction to laminated assembly 18 shown in FIG. 1, such that the lamination processes disclosed herein may be used in succession to form laminated assemblies formed of multiple OCA components (e.g., having 2, 3, 4, 5, or more laminated layers between the outer liners). For example, referring to FIG. 2, laminated assembly 18 may in one embodiment include outer liners 310, 312 and four OCA components 314, 316, 318, 320. All such components and assemblies are to be understood to be within the scope of the present disclosure. OCA components 314, 316, 318, 320 may have the same or different thicknesses to provide a desired final thickness. In optical applications, the various OCA components generally perform homogeneously in terms of criteria such as transmission and reflectance.

Figure 11:
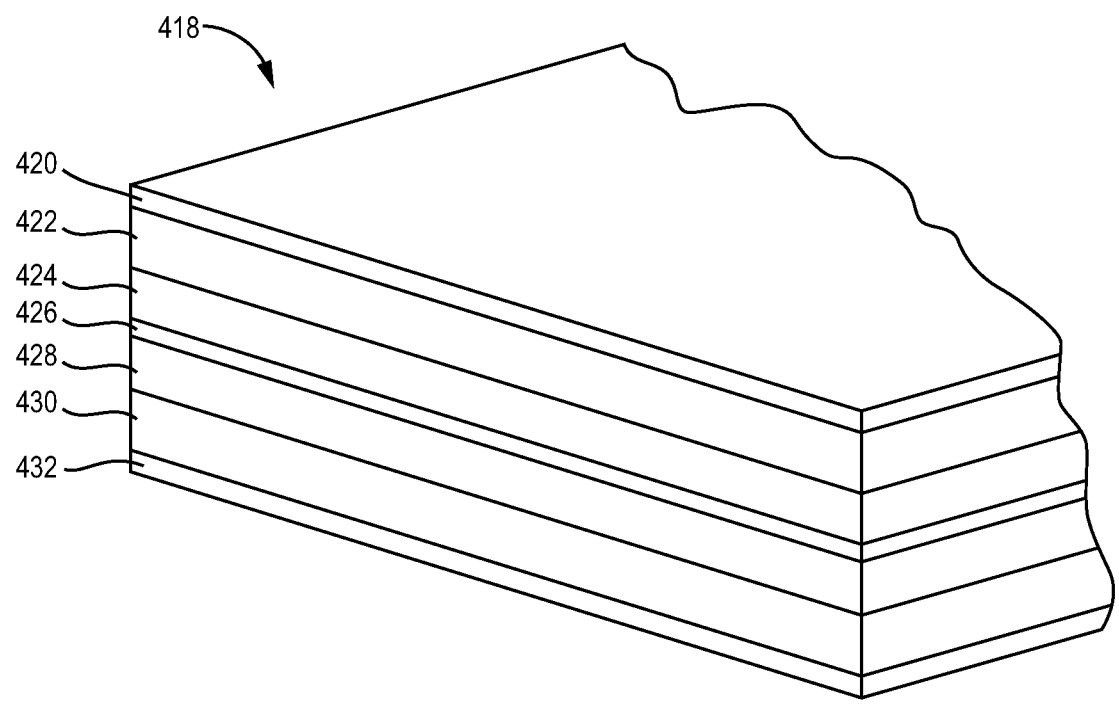
FIG. 11 is a perspective view of a laminated assembly according to another exemplary embodiment.

The laminated assemblies disclosed herein may be used in a wide variety of applications. For example, referring to FIG. 11, a laminated OCA assembly 418 is shown according to an exemplary embodiment. Assembly 418 includes outer liners 420, 432, and optical components 422, 424, 426, 428, and 430. Components 422-430 may take any suitable form, such as an OCA, a polycarbonate, a touchscreen or optical film, etc. For example, according to one embodiment, components 422 to 430 are all OCA components. According to another embodiment, components 424, 428, and 430 are OCA components, component 422 is a polycarbonate layer, and components 426 is a touch screen or optical film. According to yet another embodiment, components 424 and 428 are OCA components, components 422 and 430 are polycarbonate layers, and component 426 is a touchscreen or optical film. Other combinations are possible according to various other embodiments.

Figure 3:
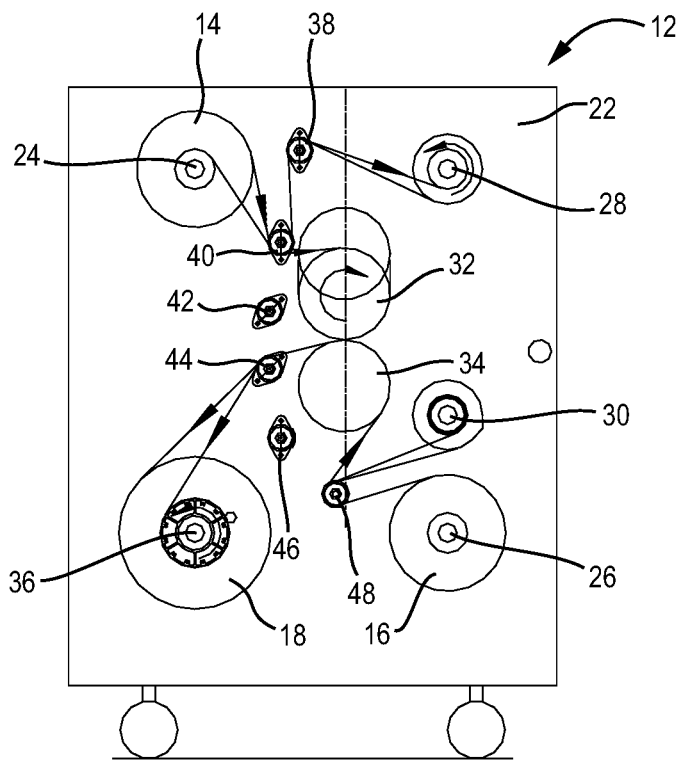
FIG. 3 is a side view of a lamination device usable with the lamination system of FIG. 1 according to an exemplary embodiment.

Referring now to FIG. 3, lamination device 12 is shown in greater detail according to an exemplary embodiment. As shown in FIG. 3, device 12 includes a frame 22 (e.g., a housing, support structure, etc.) that supports a number of elongated and cylindrical supports, rollers, and other components used in roll to roll lamination processes. Device 12 includes first and second supply shafts 24, 26, first and second liner shafts 28, 30, first and second nip rollers 32, 34, and a lamination assembly take-up or wind-up shaft 36. Device 12 further includes a number of additional rollers 38-48 (e.g., idler rollers, etc.) utilized to direct the various materials through the lamination process within device 12.

It should be understood that device 12 may take other configurations than that shown in FIG. 3, for example, to accommodate different sized materials, supports, rollers, etc. Furthermore, as shown in FIG. 3 supply shafts 24, 26 and take-up shaft 36 are provided generally within device 12, while in the schematic of FIG. 1, the supply shafts and take-up shaft are shown generally outside of device 12. The supply shafts and/or take-up shaft may be located within or outside of device 12 according to various alternative embodiments.

According to an exemplary embodiment, device 12 is configured to laminate a first OCA component such as first component 14 to a second OCA component such as second component 16 to form a laminated OCA assembly such as laminated assembly 18. As such, first component 14 (e.g., a first roll of OCA material) is provided on first supply shaft 24, and second component 16 (e.g., a second roll of OCA material) is provided on second supply shaft 26.

As shown in FIG. 3, from first supply shaft 24, first component 14 passes over roller 40, after which one of the liners of first component 14 is pulled away, thereby exposing one surface of the underlying adhesive component of first component 14. The liner is directed over roller 38 and is wound up on first liner shaft 28. The remainder of first component 14 passes around first nip roller 32 and between nip rollers 32, 34. Similarly, from second supply shaft 26, second component 16 passes over roller 48, after which one of the liners of second component 16 is pulled away, thereby exposing one surface of the underlying adhesive component of second component 16. The liner is directed to second liner shaft 30. The remainder of second component 16 passes around second nip roller 34 and between nip rollers 32, 34. As first and second components 14, 16 pass between nip rollers 32, 34, the exposed adhesive surfaces form an adhesive bond, joining first and second components 14, 16 together to form a laminated OCA assembly that is then taken up on assembly take-up shaft 36.

Figure 4:
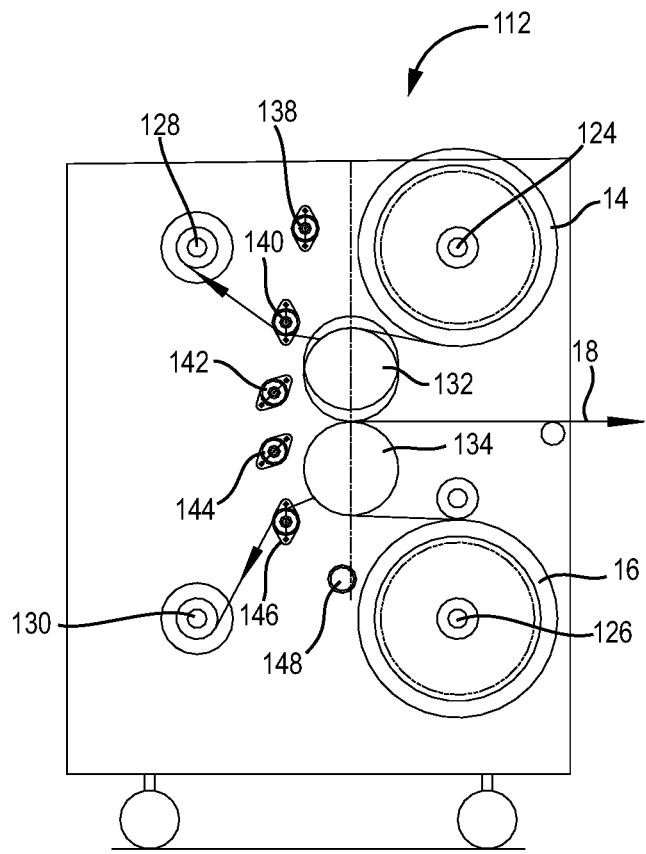
FIG. 4 is a side view of a lamination device usable with the lamination system of FIG. 1 according to another exemplary embodiment.

FIG. 4 shows an alternative configuration of a roll to roll lamination device 112 according to an exemplary embodiment. In practice, device 112 may be a result of a reconfiguration of device 12 (e.g., a rearrangement of supply rolls and idler rollers, etc.). Device 112 shares many features with device 12, except that device 112 does not include an assembly take-up shaft such as assembly take-up shaft 36 shown in FIG. 3, and the positions/arrangement of the supply and liner shafts and idler rollers differ between devices 12 and 112. Device 112 may be used rather than device 12 in cases, for example, where relatively thicker laminated assemblies are fabricated using a roll to roll lamination process (e.g., where the resultant laminated assembly is, for example, approximately 0.030 inches thick or thicker).

As shown in FIG. 4, from first supply shaft 124, first component 14 passes around nip roller 132, during which one of the liners of first component 14 is pulled away. The liner passes over roller 140 and is taken up on first liner shaft 128. The remainder of first component 14 continues around nip roller 132 and passes between nip rollers 132, 134. Similarly, from second supply shaft 126, second component 16 passes to nip roller 134 while one of the liners is taken up on second liner shaft 130. The remainder of second component 16 passes around second nip roller 134 and between nip rollers 132, 134. As first and second components 14, 16 pass between nip rollers 132, 134, the exposed adhesive surfaces form an adhesive bond to form laminated assembly 18, which in the embodiment shown in FIG. 4 may be directed from device 112 to further processing machines (e.g., die cutting machines, etc.) and/or to storage on a core or other roller, etc. In alternative embodiments, the laminated OCA assembly may be hand-sheeted.

Figure 10:
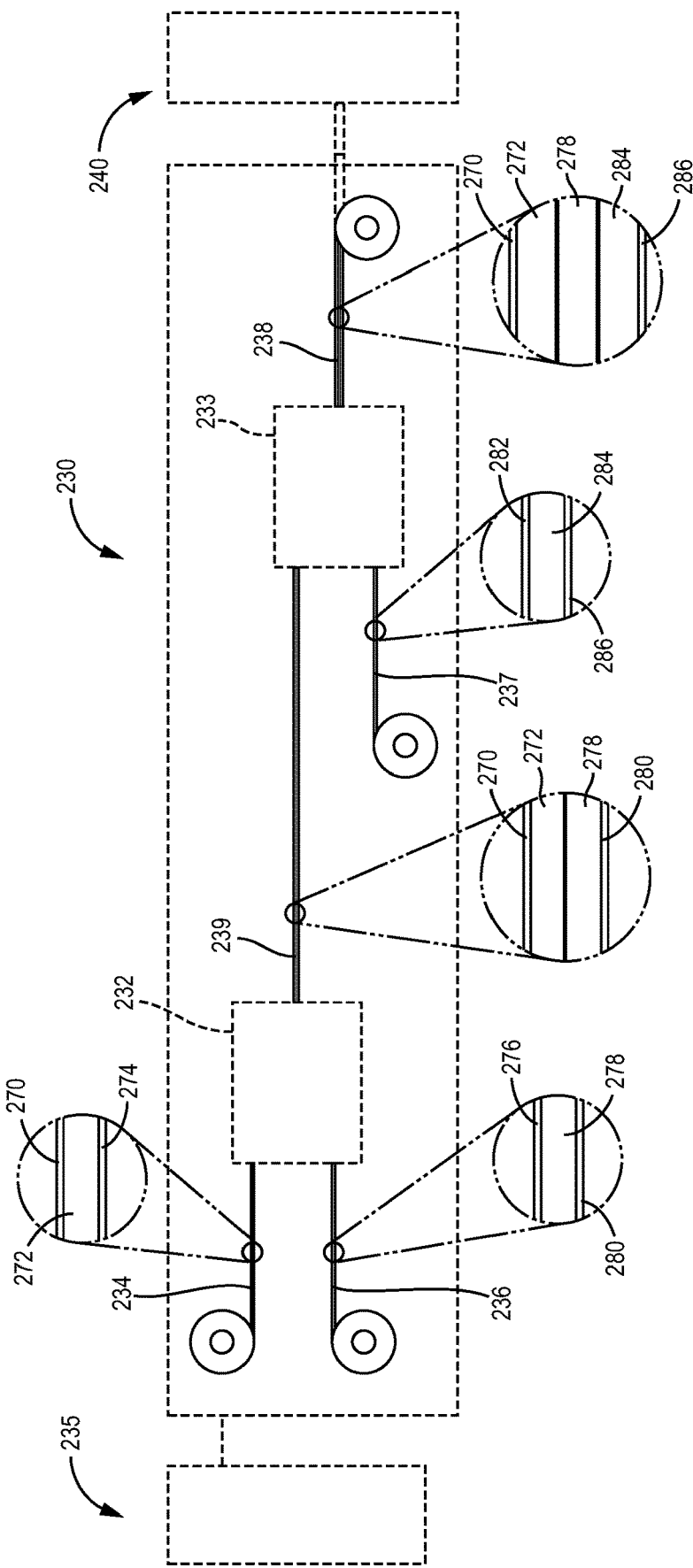
FIG. 10 is a schematic representation of a lamination system according to another exemplary embodiment.

In some embodiments, an odd number of OCA components may be utilized. For example, referring to FIG. 10, a lamination system 230 is shown according to an exemplary embodiment and includes a control system 235, lamination devices 232, 233, and other devices 240. A first OCA component 234 (including liners 270, 274 and adhesive 272) and a second OCA component 236 (including liners 276, 280 and adhesive 278) are laminated together at lamination device 232 to form an OCA subassembly 239. OCA subassembly 239 includes a first liner 270, a first OCA component 272, a second OCA component 278, and a second liner 280. OCA subassembly 239 is then laminated to a third OCA component 237 (including liners 282, 286, and adhesive 284) at lamination device 233 to form laminated OCA assembly 238 (e.g., a composite lamination assembly, etc.). Laminated OCA assembly 238 includes a first liner 270, a first adhesive component 272, a second adhesive component 278, a third adhesive component 284, and a second liner 286. Additional OCA components (e.g., films, etc.) and lamination devices may be utilized according to various other embodiments. For example, in some embodiments, two, three, or more films may be roll to roll laminated together using laminated OCA assemblies between adjacent layers.

Various parameters impact the properties of the resultant laminated OCA assembly. In order to fabricate a laminated OCA assembly having the desired characteristics with respect to properties such as transparency, flatness, lack of strain, etc., various parameters of the roll to roll lamination process must be properly selected. The parameters used in connection with roll to roll lamination processes, including nip pressure (see FIG. 5), lamination speed (see FIG. 6), and core diameters (see FIG. 7), are discussed in greater detail below.

Figure 5:
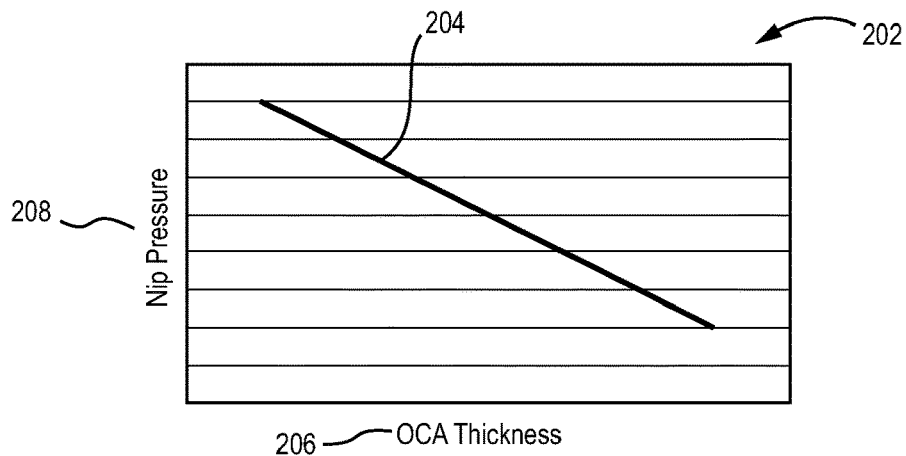
FIG. 5 is a schematic representation of the relationship between the parameters of thickness and nip pressure according to an exemplary embodiment.

Referring to FIG. 5 a graph 202 illustrating the relationship between the thickness 206 of the laminated OCA assembly (e.g., the total thickness of first component 14 and/or second component 16) and the appropriate nip pressure 208 (e.g., the pressure between the nip rollers) is shown as line 204 according to an exemplary embodiment. As shown in graph 202, the appropriate nip pressure 208 generally decreases as the thicknesses 206 of the components increases. This is in contrast to many conventional techniques of roll to roll lamination, where increased pressures are used as component thicknesses increase. In some embodiments, a first nip pressure is used to fabricate a first laminated assembly, and then the first laminated assembly is used to fabricate a second laminated assembly where a second, relatively lower, nip pressure may be used due to the increase in thickness of materials.

Figure 6:
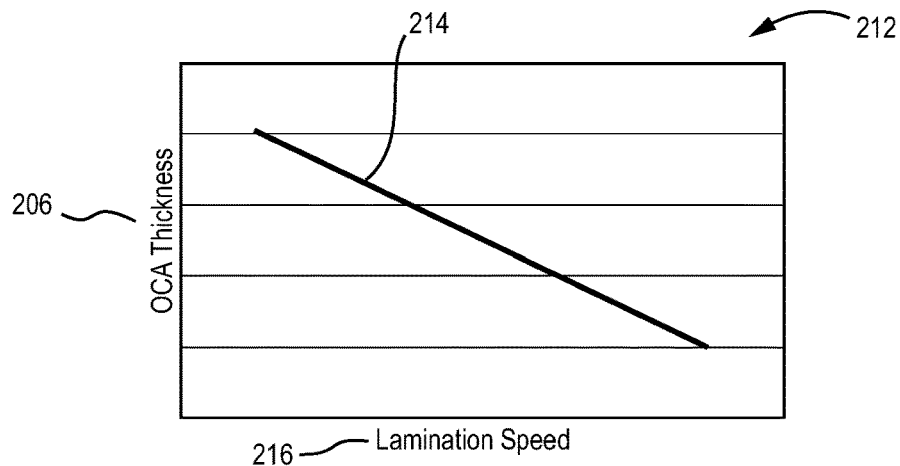
FIG. 6 is a schematic representation of the relationship between the parameters of thickness and lamination speed according to an exemplary embodiment.

Referring to FIG. 6, a graph 212 illustrating the relationship between the thickness 206 of the laminated OCA assembly (e.g., the total thickness of first component 14 and/or second component 16) and the appropriate lamination speed 216 (e.g., the speed of the nip rollers) is shown as line 214 according to an exemplary embodiment. As shown in FIG. 6, the appropriate lamination speed 216 generally decreases as the thickness 206 of the components increases. In some embodiments, a first lamination speed is used to fabricate a first laminated assembly, and then the first laminated assembly is used to fabricate a second laminated assembly where a second, relatively lower, lamination speed may be used due to the increase in thickness of materials.

Figure 7:
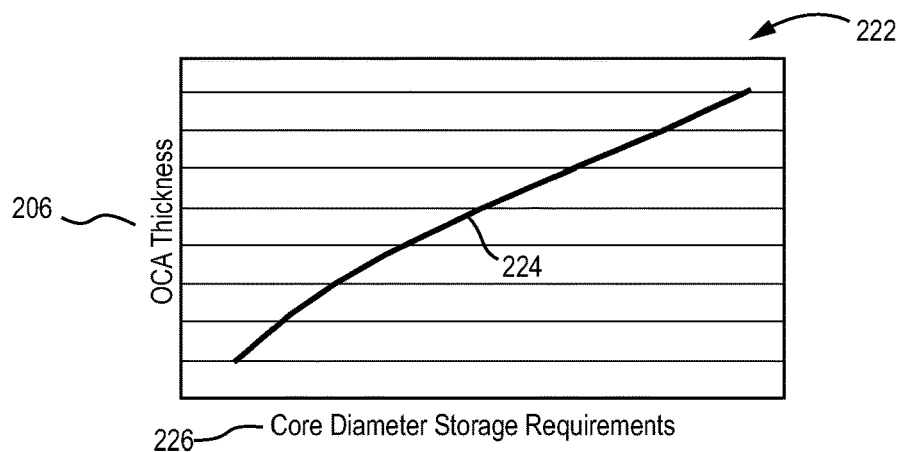
FIG. 7 is a schematic representation of the relationship between the parameters of thickness and core storage diameter according to an exemplary embodiment.

Referring to FIG. 7, a graph 222 illustrating the relationship between the thickness 206 of the laminated OCA assembly (e.g., the total thickness of first component 14 and/or second component 16) and the core diameter 226 (e.g., the core diameter used for the supply and/or assembly take-up rollers) is shown as line 224 according to an exemplary embodiment. As shown in FIG. 7, the core diameter 226 generally increases with material thickness 206 such that as thicker OCA materials are used, larger core diameters would likewise be used. Using an appropriately-sized core is of particular importance when using double liner materials (with low modulus base material) to, for example, prevent buckling of the liner(s) and/or adjacent adhesive material. Furthermore, different core diameters may be used based on whether the material will undergo further short term processing or will be stored long term on the core.

Figure 8:
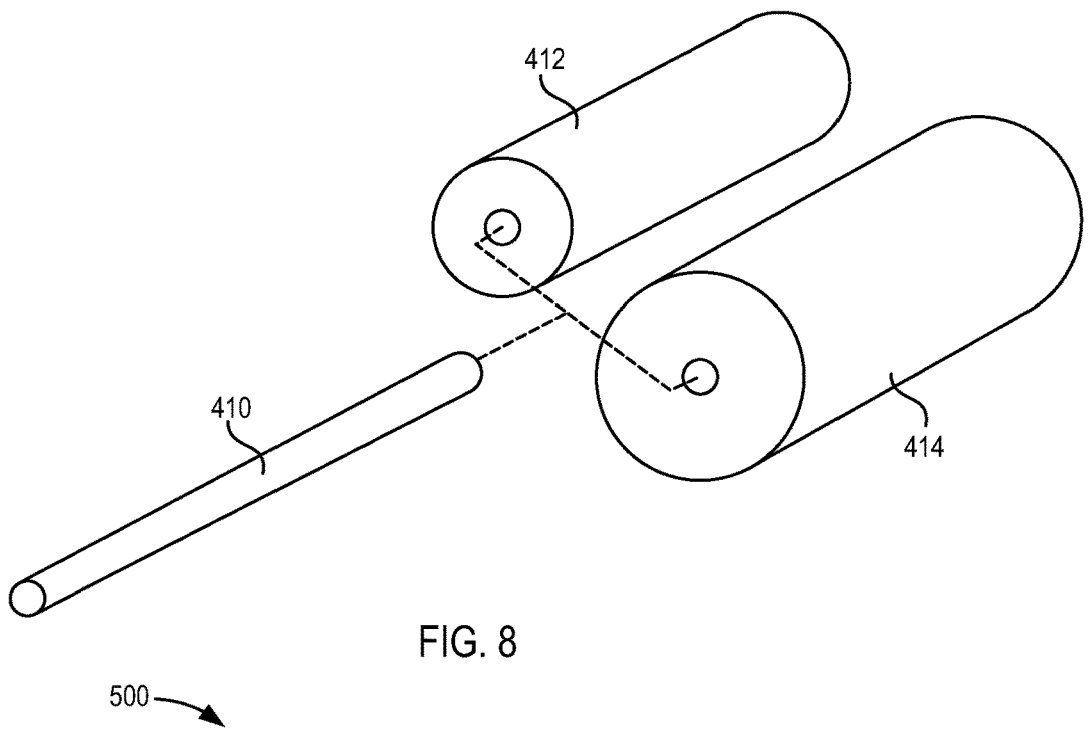
FIG. 8 is a perspective view of interchangeable core adapters for a shaft according to an exemplary embodiment.

Referring to FIG. 8, according to an exemplary embodiment, one or more of the supply shafts, assembly take-up shaft, or other rollers may comprise a core shaft 410 that is usable with one or more exchangeable core adapters such as core adapters 412, 414 shown in FIG. 8. As such, depending on the thickness of the material being used, an appropriately-sized core adapter may be selected and mounted to shaft 410. For example, core adapter 412 provides a relatively smaller diameter core than core adapter 414, and may be suitable for materials or relatively smaller thicknesses. While two core adapters 412, 414 are shown in FIG. 8, more or fewer core adapters may be used in connection with a single shaft. Furthermore, the core adapters may be secured to the shafts using any suitable means, including friction fit, snap fit, mechanical fasteners, corresponding geometric features (indents, detents, etc.), and the like. According to one embodiment, shaft 410 may have a diameter of approximately 3 inches, while other diameters may be used in alternative embodiments.

Figure 9:
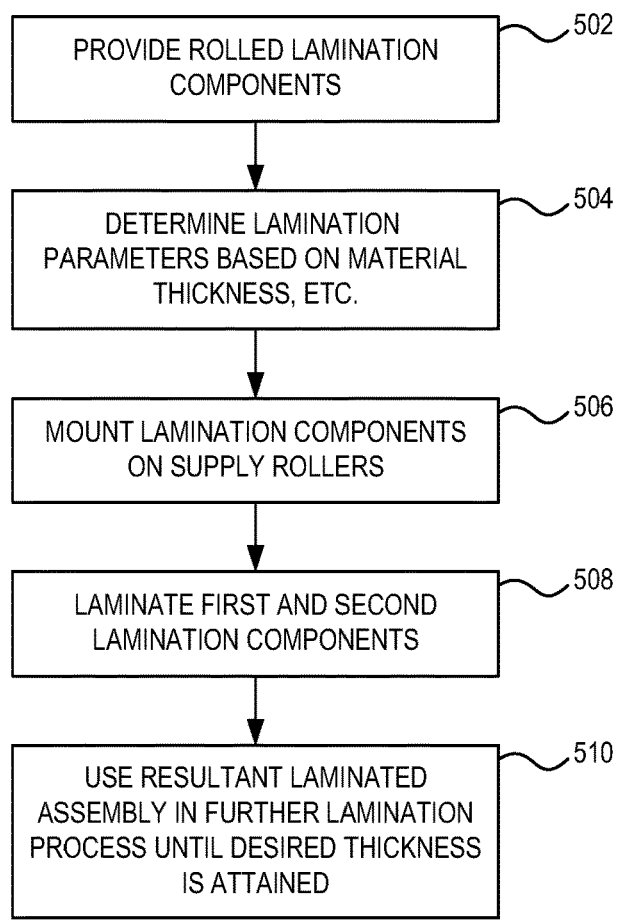
FIG. 9 is a block diagram of a method of making a laminated assembly according to an exemplary embodiment.

Referring to FIG. 9, a method 500 of fabricating a laminated assembly using a roll to roll lamination device is shown according to an exemplary embodiment. First, the rolled lamination components are provided (step 502), such as first and second components 14, 16. Based on the thicknesses of the lamination components, and the expected or desired mechanical, optical, and/or other properties of the resultant laminated assembly, the lamination parameters for the lamination process are determined (step 504). This may include, for example, determining appropriate core diameters for one or more rollers, determining an appropriate nip pressure, lamination speed, etc. Then, the first and second components are mounted onto the supply shafts (step 506), and the first and second components are laminated together to form the laminated assembly (step 508). The resultant laminated assembly may then be used in subsequent lamination processes (step 510) until a desired thickness is attained.

Referring back to FIG. 1, in some embodiments, control system 15 is configured to control operation of one or more components of a lamination device such as lamination device 12 or lamination device 112. For example, control system 15 may be configured to receive one or more inputs (e.g., material thickness data for first and second input rolls of material, etc.) from an operator, and control the operation of a lamination device based on the input. For example, control system 15 may be configured to determine and control an appropriate operating speed (e.g., by controlling the speed of one or more rollers such as the nip rollers, wind up rollers, etc.), nip pressure (e.g., by adjusting the relative positions of the nip rollers, etc.), and/or other operating parameters.

In some embodiments, the systems and methods disclosed herein are usable to fabricate a laminated optically clear adhesive assembly formed of multiple OCA components that is relatively thick (e.g., at least 0.020 inches, at least 0.060 inches, at least 0.240 inches, etc.) and maintains good transparency (e.g., at least 90 percent, etc.). Furthermore, the OCA assembly is substantially flat, of substantially uniform thickness (e.g., having less than 5%, less than 2%, etc. variation in material thickness), and free of optical defects (e.g., bubbles, wrinkles, stresses/strains, etc.). The OCA assembly may be used, for example, with laminated display assemblies of 65 inches or more in diagonal. Furthermore, the OCA assembly accommodates surface irregularities in adjacent components and significantly improves optical, mechanical, and environmental performance of the assembly.

The use of adhesive bonding such as that disclosed herein provides various attributes and/or advantages, including low (ideally zero) birefringence, a refractive index of, e.g., between 1.47 and 1.52, low moisture absorption, and a product that is haze-less, optically clear, and particle/defect free. Further characteristics typically include resistance to thermal soak and cycling, good ultraviolet (UV), infrared (IR), and life stability, non-reactivity with glass and other optical films, no out-gassing, bubble formation, or latent formations after bonding, etc. Adhesive bonding may further provide for superior adhesion to both high (e.g., glass) and low (e.g., plastics) surface energy materials, suitability for glass-plastic-glass laminations (e.g., with various coefficients of thermal expansions, etc.), and suitability for bonding at less than 90 degrees Celsius. Further yet, adhesive bonding such as that disclosed herein may provide a readily available, low-cost option that utilizes non-hazardous ingredients and provides flexibility for repairing products post-assembly, and for removal of parts from a partial and/or full assembly.

Integrating laminated OCA assemblies into various assemblies such as display assemblies may provide various other advantages, such as enhanced sunlight readability, increased impact resistance, low reflectance touch screens, enhanced protection from humidity, and high quality optical bonding of various performance-enhancing auxiliary components such as anti-glare/anti-reflection, heater glass, touch screens, UV, near-vertical incidence skywave (NVIS), electromagnetic interference (EMI), and sunlight filters, etc. Such displays and other components may have application in fields such as military and avionics (e.g., vehicle displays, etc.), marine electronics, medical applications (e.g., medical displays, etc.), mobile/smart phone displays, and the like.

The laminated OCA assemblies disclosed herein may be used in subsequent laminations, including dry film lamination processes where one or more components (e.g., cover glasses, touch screens, LCD modules, etc.) are laminated together using the laminated OCA assembly. As such, the laminated OCA assembly may be die-punched or laser-cut to a desired size and laminated (e.g., roller laminated) to a first component such as a cover glass. The OCA-laminated component and a second component (e.g., an LCD module) can then be bonded together. Utilizing such laminated OCA assemblies often provides a faster, simpler, and cleaner process, with easier to handle materials, and good adhesion relative to other bonding processes. Furthermore, laminated OCA assemblies optimize material usage and reduce material waste, provide uniform thickness and dimensional control, enable automation, permit in the field repairs and replacements, and make bonding of multiple components simultaneously possible. Further yet, using laminated OCA assemblies provides for lower cost operations, permits bonding of different types of components (e.g., soft to soft, hard to hard, soft to hard, etc.), improves environmental performance (e.g., vibration/shock, and temperature tolerance, etc.), and permits the production of both smaller and larger sized objects.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components.

It is important to note that the construction and arrangement of the elements of the structures, systems, and methods as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:

1. A method of making a laminated optically clear adhesive (OCA) assembly, the method comprising:
   providing a first OCA component having a first thickness;
   providing a second OCA component having a second thickness;
   laminating the first OCA component and the second OCA component using a roll to roll lamination process to form a first laminated OCA assembly;
   providing a second laminated OCA assembly; and
   laminating the first laminated OCA assembly and the second laminated OCA assembly to form a third laminated OCA assembly;
   wherein:
      the first OCA component and the second OCA component are laminated together at a nip roller assembly, the nip roller assembly using a nip roller pressure selected based on the total thickness of the first and second OCA components such that the nip roller pressure decreases as the total thickness of the first and second OCA components increases;
      the third laminated OCA assembly is laminated using a lower nip roller pressure than the nip roller pressure used to laminate the first laminated OCA assembly; and
      the first laminated assembly is taken up on a first storage core having a first diameter and the third laminated assembly is taken up on a second storage core having a second diameter greater than the first diameter.

2. The method of claim 1, wherein the third laminated OCA assembly has a thickness of at least approximately 0.020 inches.

3. The method of claim 1, wherein a lamination speed used to fabricate the third laminated OCA assembly is less than a lamination speed used to fabricate the first laminated OCA assembly.

4. The method of claim 1, wherein the first laminated OCA assembly has a transparency of at least 90 percent.

5. The method of claim 1, wherein the first laminated OCA assembly has a thickness of at least approximately 0.020 inches.

6. The method of claim 1, wherein the first laminated OCA assembly has a thickness of at least approximately 0.060 inches.

7. The method of claim 1, further comprising:
   fabricating a composite optical assembly by roll to roll laminating a first film, a second film, and a third film to form the third laminated OCA assembly;
   wherein the first laminated OCA assembly is provided between the first and second films, and the second laminated OCA assembly is provided between the second and third films.

8. The method of claim 1, wherein the first laminated OCA assembly is configured to be coupled to a touchscreen assembly.

9. A method of making a laminated assembly, the method comprising:
   providing a first component having a first thickness;
   providing a second component having a second thickness;
   laminating the first component and the second component using a roll to roll lamination process to form a first laminated assembly;
   providing a second laminated assembly; and
   laminating the first laminated assembly and the second laminated assembly to form a third laminated assembly;
   wherein:
      the first component and the second component are laminated together at a nip roller assembly, the nip roller assembly using a nip roller pressure selected based on the total thickness of the first and second components such that the nip roller pressure decreases as the total thickness of the first and second components increases;
      the third laminated assembly is laminated using a lower nip roller pressure than the nip roller pressure used to laminate the first laminated assembly; and
      a lamination speed used to fabricate the third laminated assembly is less than a lamination speed used to fabricate the first laminated assembly.

10. The method of claim 9, wherein the first laminated assembly has a transparency of at least 90 percent.

11. The method of claim 9, further comprising:
    fabricating a composite optical assembly by roll to roll laminating a first film, a second film, and a third film to form the third laminated assembly;
    wherein the first laminated assembly is provided between the first and second films, and the second laminated assembly is provided between the second and third films.

12. A method of making a laminated optically clear adhesive (OCA) assembly, the method comprising:
- providing a first input roll of a first OCA component having a first thickness;
- providing a second input roll of second OCA component having a second thickness;
- laminating the first OCA component and the second OCA component using a roll to roll lamination process to form a first laminated OCA assembly;
- providing a second laminated OCA assembly; and
- laminating the first laminated OCA assembly and the second laminated OCA assembly to form a third laminated OCA assembly;
- wherein:
  - the first OCA component and the second OCA component are laminated together at a nip roller assembly, the nip roller assembly using a nip roller pressure selected based on the total thickness of the first and second OCA components on the first and second input rolls such that the nip roller pressure decreases as the total thickness of the first and second OCA components increases;
  - the third laminated OCA assembly is laminated using a lower nip roller pressure than the nip roller pressure used to laminate the first laminated OCA assembly; and
  - a lamination speed used to fabricate the third laminated OCA assembly is less than a lamination speed used to fabricate the first laminated OCA assembly.

13. The method of claim 12, wherein the first laminated OCA assembly has a transparency of at least 90 percent.

14. The method of claim 12, further comprising:
- fabricating a composite optical assembly by roll to roll laminating a first film, a second film, and a third film to form the third laminated OCA assembly;
- wherein the first laminated OCA assembly is provided between the first and second films, and the second laminated OCA assembly is provided between the second and third films.

15. The method of claim 12, wherein the first laminated OCA assembly is configured to be coupled to a touchscreen assembly.

* * * * *